United States Patent
Kanada

(10) Patent No.: US 10,650,282 B2
(45) Date of Patent: May 12, 2020

(54) MEDICAL IMAGE CLASSIFICATION APPARATUS, METHOD, AND PROGRAM

(71) Applicant: FUJIFILM Corporation, Tokyo (JP)

(72) Inventor: Shoji Kanada, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 163 days.

(21) Appl. No.: 15/928,596

(22) Filed: Mar. 22, 2018

(65) Prior Publication Data

US 2018/0293465 A1   Oct. 11, 2018

(30) Foreign Application Priority Data

Apr. 10, 2017   (JP) .................................. 2017-077360

(51) Int. Cl.
  *G06K 9/62*   (2006.01)
  *G06K 9/00*   (2006.01)
  *G06T 7/00*   (2017.01)
  *G06T 7/11*   (2017.01)

(52) U.S. Cl.
  CPC ....... *G06K 9/6267* (2013.01); *G06K 9/00147* (2013.01); *G06T 7/0012* (2013.01); *G06T 7/11* (2017.01); *G06K 2209/05* (2013.01); *G06T 2207/20081* (2013.01); *G06T 2207/30061* (2013.01); *G06T 2207/30096* (2013.01)

(58) Field of Classification Search
  CPC ........... G06K 2209/05; G06K 9/00147; G06K 9/6267; G06T 2207/20081; G06T 2207/30061; G06T 2207/30096; G06T 7/0012; G06T 7/11
  See application file for complete search history.

(56) References Cited

U.S. PATENT DOCUMENTS

2008/0267471 A1* 10/2008 Yu ..................... G06K 9/4604
                                                  382/128

FOREIGN PATENT DOCUMENTS

JP   2002-230518 A   8/2002

OTHER PUBLICATIONS

Jacob et al. "Evaluation of computer-based computer tomography stratification against outcome models in connective tissue disease-related interstitial lung disease: a patient outcome study", BMC Medicine (2016) 14:190, p. 1-13.

* cited by examiner

*Primary Examiner* — Nirav G Patel
(74) *Attorney, Agent, or Firm* — Birch, Stewart, Kolasch & Birch, LLP

(57) ABSTRACT

A first classification unit outputs a plurality of evaluation values indicating the possibility of being each of a plurality of types of case regions for each pixel of a three-dimensional image. Based on selected conversion definition information, a second classification unit converts a first classification result for each pixel of the three-dimensional image based on the plurality of evaluation values, and outputs a second classification result for each pixel of the three-dimensional image.

11 Claims, 9 Drawing Sheets

| CASE | EVALUATION VALUE |
|---|---|
| RETICULAR SHADOW | 8.5 (MAXIMUM) |
| FROSTED GLASS SHADOW | 7.6 |
| BRONCHODILATION | 3.2 |
| INFILTRATION SHADOW | 2.9 |
| . . . | . . . |
| . . . | . . . |
| NORMAL LUNG | −7.1 |
| LOW ABSORPTION REGION (EMPHYSEMA) | −12.3 |

FIG. 5

| CASE | PULMONARY EMPHYSEMA GROUP | INTERSTITIAL PNEUMONIA GROUP |
|---|---|---|
| NORMAL LUNG | NORMAL LUNG | NORMAL LUNG |
| INFILTRATION SHADOW | HIGH CONCENTRATION INCLUDING INFILTRATION SHADOW | HIGH CONCENTRATION INCLUDING INFILTRATION SHADOW |
| TUMOR SHADOW | HIGH CONCENTRATION INCLUDING INFILTRATION SHADOW | HIGH CONCENTRATION INCLUDING INFILTRATION SHADOW |
| BRONCHODILATION | BRONCHIAL TUBE | BRONCHIAL TUBE |
| BRONCHIAL WALL THICKENING | BRONCHIAL TUBE | BRONCHIAL TUBE |
| FROSTED GLASS SHADOW | FROSTED GLASS SHADOW AND THE LIKE | FROSTED GLASS SHADOW |
| PALE FROSTED GLASS SHADOW | FROSTED GLASS SHADOW AND THE LIKE | PALE FROSTED GLASS SHADOW |
| RETICULAR SHADOW | FROSTED GLASS SHADOW AND THE LIKE | RETICULAR SHADOW |
| LINEAR SHADOW | FROSTED GLASS SHADOW AND THE LIKE | LINEAR SHADOW |
| MILD LOW ABSORPTION REGION | MILD LOW ABSORPTION REGION | LOW ABSORPTION REGION |
| CENTRILOBULAR EMPHYSEMA | CENTRILOBULAR EMPHYSEMA | LOW ABSORPTION REGION |
| PANLOBULAR EMPHYSEMA | PANLOBULAR EMPHYSEMA | LOW ABSORPTION REGION |
| . . . | . . . | . . . |

FIG. 6

| CASE | WEIGHTING COEFFICIENT | EVALUATION VALUE | WEIGHTED EVALUATION VALUE |
|---|---|---|---|
| RETICULAR SHADOW | 0.8 | 8.5 (MAXIMUM) | 6.8 |
| FROSTED GLASS SHADOW | 1.1 | 7.6 | 8.36 (MAXIMUM) |
| BRONCHODILATION | 0.8 | 3.2 | 2.56 |
| INFILTRATION SHADOW | 1.0 | 2.9 | 2.9 |
| . . . | . . . | . . . | . . . |
| . . . | . . . | . . . | . . . |
| NORMAL LUNG | 1.2 | -7.1 | -8.5 |
| LOW ABSORPTION REGION (EMPHYSEMA) | 0.9 | -12.3 | -11.07 |

FIG. 7

| DOCTOR ID | DISEASE NAME | CONVERSION DEFINITION INFORMATION | CONVERSION METHOD | CONVERSION PARAMETER |
|---|---|---|---|---|
| ⟨COMMON TO DOCTORS⟩ | COPD | PULMONARY EMPHYSEMA | (1) | ⟨PULMONARY EMPHYSEMA GROUP DEFINITION⟩ |
| ⟨COMMON TO DOCTORS⟩ | IDIOPATHIC PULMONARY ADENOMATOSIS | INTERSTITIAL PNEUMONIA | (1) | ⟨INTERSTITIAL PNEUMONIA GROUP DEFINITION⟩ |
| ⟨COMMON TO DOCTORS⟩ | LUNG CANCER | ANTICANCER DRUG TREATMENT | (2) | W01=12.0, W02=3.3, W03=9.3, ... |
| ⟨COMMON TO DOCTORS⟩ | LUNG CANCER | LUNG EXTRACTION SURGERY | (2) | W01=21.6, W02=15.3, W03=1.3, ... |
| 109801 | COPD | PULMONARY EMPHYSEMA FOR A DOCTOR EXCLUSIVE USE | (1) | ⟨INTERSTITIAL PNEUMONIA GROUP DEFINITION OF DOCTOR △△⟩ |
| 109801 | IDIOPATHIC PULMONARY ADENOMATOSIS | INFILTRATION SHADOW FOR A DOCTOR EXCLUSIVE USE | (2) | Pc1=0.5, Pc2=-0.3, Pc3=-0.9, ... |
| 100311 | COPD | PULMONARY EMPHYSEMA FOR B DOCTOR EXCLUSIVE USE | (2) | W01=18.3, W02=27.0, W03=-3.2, ... |
| 100307 | LUNG CANCER | LUNG CANCER FOR C DOCTOR EXCLUSIVE USE | (2) | W01=7.1, W02=16.7, W03=1.0, ... |

FIG. 13

| CASE | WEIGHTING COEFFICIENT | EVALUATION VALUE | WEIGHTED EVALUATION VALUE |
|---|---|---|---|
| RETICULAR SHADOW | 0.8 | 8.5 (MAXIMUM) | 6.8 |
| FROSTED GLASS SHADOW | 1.1 | 7.6 | 8.36 |
| BETWEEN RETICULAR SHADOW AND FROSTED GLASS SHADOW | 1.2 | - | 9.63 |
| BRONCHODILATION | 0.8 | 3.2 | 2.56 |
| INFILTRATION SHADOW | 1.0 | 2.9 | 2.9 |
| . . . | . . . | . . . | . . . |
| . . . | . . . | . . . | . . . |
| NORMAL LUNG | 1.2 | -7.1 | -8.5 |
| LOW ABSORPTION REGION (EMPHYSEMA) | 0.9 | -12.3 | -11.07 |

US 10,650,282 B2

MEDICAL IMAGE CLASSIFICATION APPARATUS, METHOD, AND PROGRAM

CROSS REFERENCE TO RELATED APPLICATIONS

The present application claims priority under 35 U.S.C. § 119 to Japanese Patent Application No. 2017-077360 filed on Apr. 10, 2017. The above application is hereby expressly incorporated by reference, in its entirety, into the present application.

BACKGROUND

Technical Field

The present invention relates to a medical image classification apparatus, method, and program for classifying pixels of a medical image into a plurality of types of case regions.

Related Art

Image diagnosis using medical images obtained by capturing a radiographic image and an ultrasound image of a patient, who is a subject, has been performed. In recent years, due to advances in medical apparatuses such as computed tomography (CT) apparatuses and magnetic resonance imaging (MRI) apparatuses, high-quality three-dimensional images with high resolution are used for image diagnosis.

Incidentally, interstitial pneumonia is known as a disease of the lung. A method of analyzing CT images of a patient with interstitial pneumonia and classifying and quantifying lesions showing specific symptoms, such as honeycomb lungs, reticular shadows, and cysts contained in the CT images, has been proposed (refer to "Evaluation of computer-based computer tomography stratification against outcome models in connective tissue disease-related interstitial lung disease: a patient outcome study, Joseph Jacobi, BMC Medicine (2016) 14:190, DOI 10. 1186/s12916-016-0739-7" and "Quantitative evaluation of CT images of interstitial pneumonia using computer, Tae Iwasawa, tomographic image study Magazine Vol. 41, No. 2, August 2014"). By analyzing the CT images and classifying and quantifying lesions in this manner, the degree of lung disease can be easily determined. In addition, by assigning different colors to the regions classified and quantified in this manner, it is possible to easily determine how much a region of a specific symptom is included in the image.

As a method of classifying lesions, for example, a method in which a histogram of a local region mainly including determination target pixels in a CT image is created, the created histogram is correlated with a histogram of a sample prepared in advance for each type of lesion. and the determination target pixels are classified into a lesion corresponding to the best matching sample histogram has been proposed in "Quantitative evaluation of CT images of interstitial pneumonia using computer, Tae Iwasawa, tomographic image study Magazine Vol. 41, No. 2, August 2014". JP2002-230518A has proposed a method in which lesion positions are detected from a diagnosis target image, the feature amounts of all the detected lesion positions are calculated, and a probability that the detected lesion has a specific disease name is calculated based on the feature amounts and statistics, such as texture statistics stored in a database. In addition, a method of classifying lesions using a discriminator learned by a method, such as deep learning, has been proposed.

However, in actual medical practice, the definition of a case such as a lesion is not necessarily clear, and the classification of cases may differ slightly depending on a doctor who observes the image, purposes, and the like. Each lesion has a characteristic according to the disease. However, for the evaluation of disease, it is important to evaluate the size, change, and the like of a region according to the type of case defined for each disease so as to clearly show the state of the disease. For this reason, it is necessary to change and manage the definition of a case for each disease. In the methods disclosed in "Quantitative evaluation of CT images of interstitial pneumonia using computer, Tae Iwasawa, tomographic image study Magazine Vol. 41, No. 2, August 2014" and JP2002-230518A, cases are classified based on predetermined criteria such as a sample histogram and statistics. Therefore, it is difficult to classify pixels of a medical image into case regions according to a doctor, purposes, and the like. In particular, in the case of classifying case regions using a discriminator, it is possible to appropriately classify the case regions by preparing teacher data according to a doctor or purposes and performing learning. However, it is difficult to prepare a large amount of teacher data for learning according to a doctor or purposes.

SUMMARY

The invention has been made in view of the above circumstances, and it is an object of the invention to make it possible to appropriately classify pixels of a medical image into a plurality of types of case regions according to a doctor, purposes, and the like.

A medical image classification apparatus according to the invention is a medical image classification apparatus for classifying pixels of a medical image into a plurality of types of case regions, and comprises: first classification unit for outputting a plurality of evaluation values indicating a possibility of being each of the plurality of types of case regions for each pixel of the medical image; storage unit for storing a plurality of pieces of conversion definition information for calculating a second classification result for each pixel of the medical image by converting a first classification result for each pixel of the medical image based on the plurality of evaluation values; and second classification unit for outputting the second classification result by converting the first classification result based on conversion definition information selected from the plurality of pieces of conversion definition information.

The "case region" means a region showing a specific symptom or specific form within the medical image. Therefore, in the present embodiment, it is assumed that a region of a structure itself showing a specific form, such as the heart and the diaphragm, is also included in the case region.

In the medical image classification apparatus according to the invention, the conversion definition information may define further classification of the plurality of types of case regions into fewer types of case regions than the plurality of types of case regions, and the second classification unit may classify each pixel of the medical image into any of the fewer types of case regions and output the second classification result.

In the medical image classification apparatus according to the invention, the second classification unit may output the second classification result obtained by classifying each pixel of the medical image into any of the plurality of types of case regions.

In the medical image classification apparatus according to the invention, the conversion definition information may define a weighting coefficient for each of the plurality of types of case regions. The second classification unit may calculate a plurality of weighted evaluation values by performing a weighting operation on the plurality of evaluation values based on the weighting coefficient, classify each pixel of the medical image into any of the plurality of types of case regions based on the weighted evaluation values, and output the second classification result.

In the medical image classification apparatus according to the invention, the storage unit may store at least one of the conversion definition information for each patient, the conversion definition information for each hospital, the conversion definition information for each purpose, or the conversion definition information for each doctor.

In the medical image classification apparatus according to the invention, the first classification unit may have a first discriminator learned so as to output a plurality of evaluation values indicating a possibility of being each of the plurality of types of case regions for each pixel of the medical image.

In the medical image classification apparatus according to the invention, the first discriminator may have a plurality of hierarchies learned by a deep learning method, and the plurality of evaluation values may be output from a final hierarchy of the plurality of hierarchies. The second classification unit may output the second classification result by further using an output of a hierarchy before the final hierarchy in the first discriminator.

"Before the final hierarchy" includes not only a hierarchy immediately before the final hierarchy but also a hierarchy before the hierarchy immediately before the final hierarchy.

In the medical image classification apparatus according to the invention, the conversion definition information may be a second discriminator that is learned so as to output the second classification result with the plurality of evaluation value as an input.

The medical image classification apparatus according to the invention may further comprise display control unit for displaying the second classification result on display unit.

The medical image classification apparatus according to the invention may further comprise input unit for receiving an instruction to modify the second classification result and first modification unit for modifying the selected conversion definition information based on the modification instruction.

The medical image classification apparatus according to the invention may further comprise second modification unit for modifying the plurality of pieces of conversion definition information such that the second classification result matches that in a case where the plurality of evaluation values output from the first classification unit before change are used in a case where the first classification unit is changed.

A medical image classification method according to the invention is a medical image classification method of classifying pixels of a medical image into a plurality of types of case regions, and comprises: outputting a plurality of evaluation values indicating a possibility of being each of the plurality of types of case regions for each pixel of the medical image; and outputting a second classification result by converting a first classification result based on conversion definition information selected from a plurality of pieces of conversion definition information for calculating the second classification result for each pixel of the medical image by converting the first classification result for each pixel of the medical image based on the plurality of evaluation values.

In addition, a program causing a computer to execute the medical image classification method according to the invention may be provided.

Another medical image classification apparatus according to the invention comprises: a memory that stores commands to be executed by a computer; and a processor configured to execute the stored commands. The processor executes: processing for outputting a plurality of evaluation values indicating a possibility of being each of the plurality of types of case regions for each pixel of the medical image; and processing for outputting a second classification result by converting a first classification result based on conversion definition information selected from a plurality of pieces of conversion definition information for calculating the second classification result for each pixel of the medical image by converting the first classification result for each pixel of the medical image based on the plurality of evaluation values.

According to the invention, a plurality of evaluation values indicating the possibility of being each of the plurality of types of case regions are output for each pixel of the medical image, and the second classification result is output by converting the first classification result based on the conversion definition information selected from a plurality of pieces of conversion definition information for calculating the second classification result for each pixel of the medical image by converting the first classification result for each pixel of the medical image based on the plurality of evaluation values. Therefore, it is possible to appropriately classify the pixels of the medical image into a plurality of types of case regions according to the selected conversion definition information.

BRIEF DESCRIPTION OF THE DRAWINGS

FIG. 5 is a diagram showing first conversion definition information.

FIG. 6 is a diagram showing second conversion definition information together with an evaluation value in a certain pixel.

FIG. 7 is a diagram showing conversion definition information defined for each doctor.

FIG. 13 is a diagram showing a second classification result in a case where an intermediate value of the evaluation value is defined in conversion definition information.

DETAILED DESCRIPTION

Figure 1:
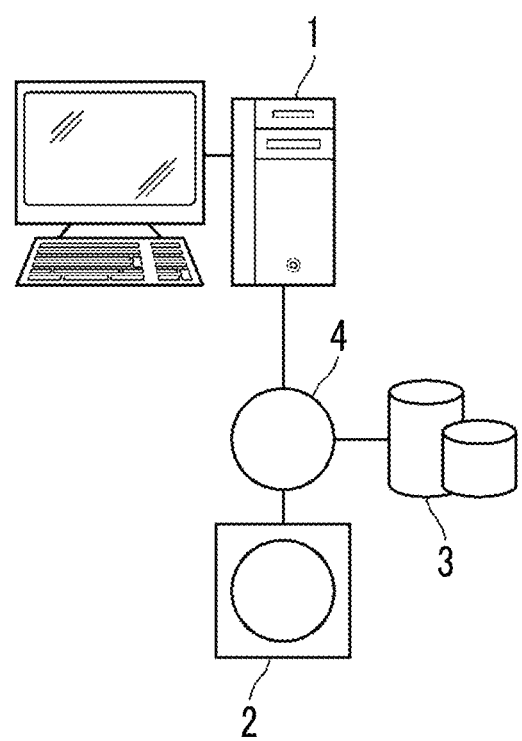
FIG. 1 is a hardware configuration diagram showing an outline of a diagnostic support system to which a medical image classification apparatus according to a first embodiment of the invention is applied.

Hereinafter, an embodiment of the invention will be described with reference to the accompanying diagrams. FIG. 1 is a hardware configuration diagram showing the outline of a diagnostic support system to which a medical image classification apparatus according to a first embodiment of the invention is applied. As shown in FIG. 1, in the diagnostic support system, a medical image classification apparatus 1 according to the present embodiment, a three-dimensional image capturing apparatus 2, and an image storage server 3 are communicably connected to each other through a network 4.

The three-dimensional image capturing apparatus 2 is an apparatus that generates a three-dimensional image showing a part, which is a part to be examined of a subject, by imaging the part. Specifically, the three-dimensional image capturing apparatus 2 is a CT apparatus, an MRI apparatus, a positron emission tomography (PET) apparatus, or the like. The three-dimensional image generated by the three-dimensional image capturing apparatus 2 is transmitted to the image storage server 3 and is stored therein. In the present embodiment, the diagnostic target part of the patient who is a subject is the lungs, and the three-dimensional image capturing apparatus 2 is a CT apparatus and generates a CT image of the chest including the lungs of the subject as a three-dimensional image V0. The three-dimensional image V0 corresponds to a medical image.

The image storage server 3 is a computer that stores and manages various kinds of data, and includes a large-capacity external storage device and software for database management. The image storage server 3 communicates with other devices through the wired or wireless network 4 to transmit and receive image data or the like. Specifically, the image storage server 3 acquires various kinds of data including the image data of the three-dimensional image V0 generated by the three-dimensional image capturing apparatus 2 through the network, and stores the various kinds of data in a recording medium, such as a large-capacity external storage device, and manages the various kinds of data. The storage format of image data and the communication between devices through the network 4 are based on a protocol, such as a digital imaging and communication in medicine (DICOM).

The medical image classification apparatus 1 is realized by installing a medical image classification program of the invention on one computer. The computer may be a workstation or a personal computer that is directly operated by a doctor who performs diagnosis, or may be a server computer connected to these through a network. The medical image classification program is distributed by being recorded on a recording medium, such as a digital versatile disc (DVD) or a compact disk read only memory (CD-ROM), and is installed onto the computer from the recording medium. Alternatively, the medical image classification program is stored in a storage device of a server computer connected to the network or in a network storage so as to be accessible from the outside, and is downloaded and installed onto a computer used by a doctor as necessary.

Figure 2:
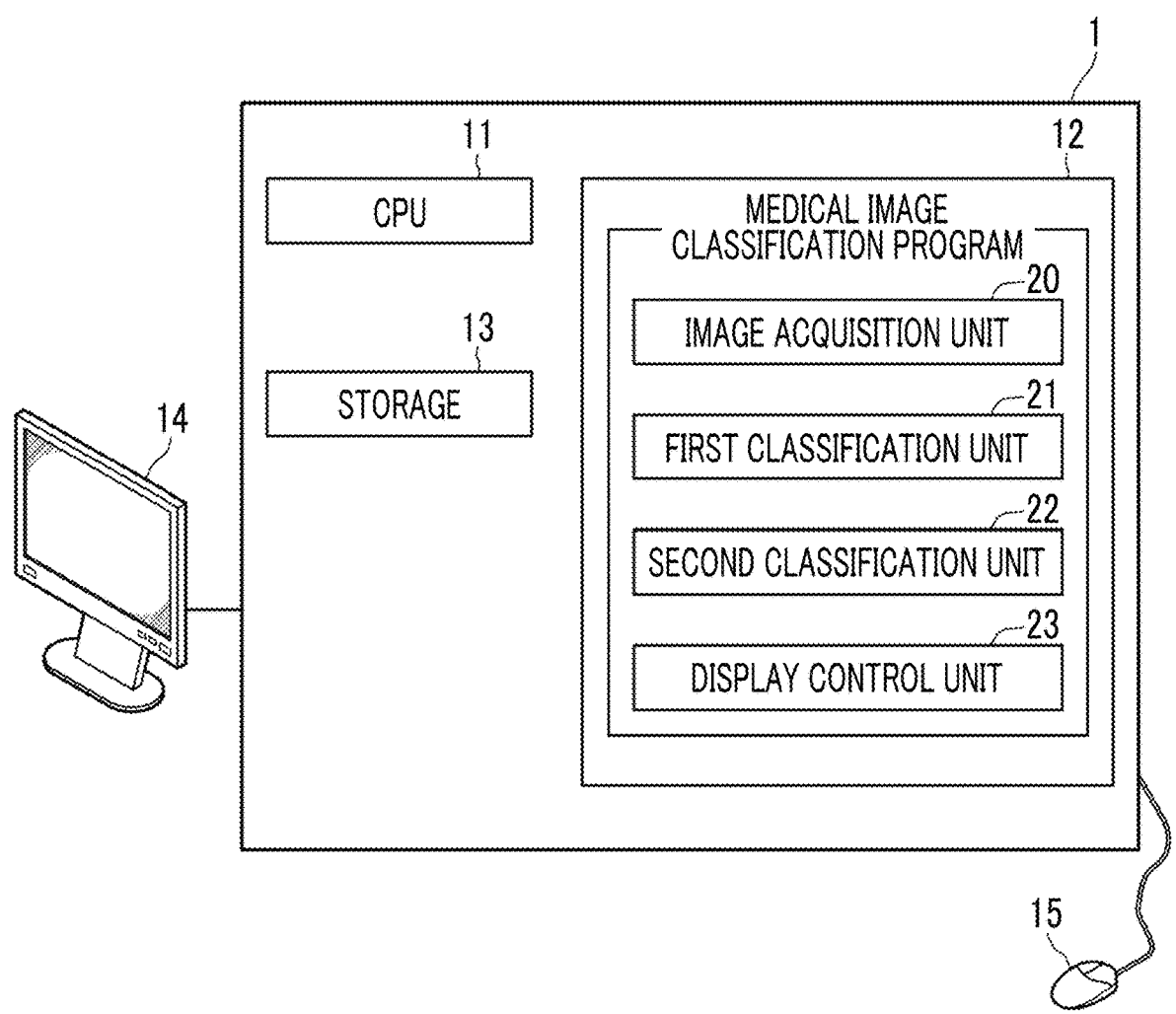
FIG. 2 is a schematic block diagram showing the configuration of the medical image classification apparatus according to the first embodiment.

FIG. 2 is a diagram showing the schematic configuration of the medical image classification apparatus according to the first embodiment realized by installing a medical image classification program on a computer. As shown in FIG. 2, the medical image classification apparatus 1 includes a central processing unit (CPU) 11, a memory 12, and a storage 13 as the configuration of a standard workstation. A display 14 and an input unit 15, such as a mouse, are connected to the medical image classification apparatus 1. The input unit 15 corresponds to input unit.

Three-dimensional images of the subject acquired from the image storage server 3 through the network 4 and various kinds of information including information necessary for processing are stored in the storage 13.

A medical image classification program is stored in the memory 12. As processing to be executed by the CPU 11, the medical image classification program defines: image acquisition processing for acquiring the three-dimensional image V0 that is a classification target; first classification processing for outputting a plurality of evaluation values indicating the possibility of being each of a plurality of types of case regions for each pixel of the three-dimensional image V0; second classification processing for outputting a second classification result by converting a first classification result for each pixel of the three-dimensional image V0 based on the plurality of evaluation values and converting the first classification result based on conversion definition information selected from a plurality of pieces of conversion definition information for calculating the second classification result for each pixel of the three-dimensional image V0; and display control processing for displaying the second classification result on the display 14.

The CPU 11 executes these processes according to the program, so that the computer functions as an image acquisition unit 20, a first classification unit 21, a second classification unit 22, and a display control unit 23. The medical image classification apparatus 1 may include a plurality of processors or processing circuits for performing image acquisition processing, first classification processing, second classification processing, and display control processing. The medical image classification apparatus 1 of the present embodiment may be configured to include only the first classification unit 21, the second classification unit 22, and the display control unit 23. In the present embodiment, the storage 13 and the image storage server 3 correspond to storage unit.

The image acquisition unit 20 acquires the three-dimensional image V0, which is a classification target, from the image storage server 3. In a case where the three-dimensional image V0 is already stored in the storage 13, the image acquisition unit 20 may acquire the three-dimensional image V0 from the storage 13.

The first classification unit 21 classifies pixels of the three-dimensional image V0 into a plurality of types of case regions. In the present embodiment, the first classification unit 21 has a discriminator that is a multilayered neural network deep-learned so as to be able to classify pixels, which are included in a lung region included in the three-dimensional image V0, into a plurality of types of case regions. The discriminator provided in the first classification unit 21 corresponds to a first discriminator. In the multilayered neural network, arithmetic processing is performed on a plurality of different pieces of calculation result data obtained from the preceding hierarchy with respect to input data, that is, feature amount extraction result data, using various kernels in each layer, feature amount data obtained as described above is acquired, and further arithmetic processing is performed on the feature amount data in the subsequent processing layer, so that it is possible to improve the recognition rate of feature amounts and classify the input data into a plurality of classes.

In the present embodiment, a multilayered neural network 40 outputs the result of the classification of the lung region into a plurality of types of case regions with the three-dimensional image V0 as an input. However, the multilayered neural network 40 can also be configured to output the result of the classification of the lung region into a plurality of types of case regions with a two-dimensional tomographic image, which shows each tomographic plane of a subject that forms the three-dimensional image V0, as an input.

Figures 3, 4:
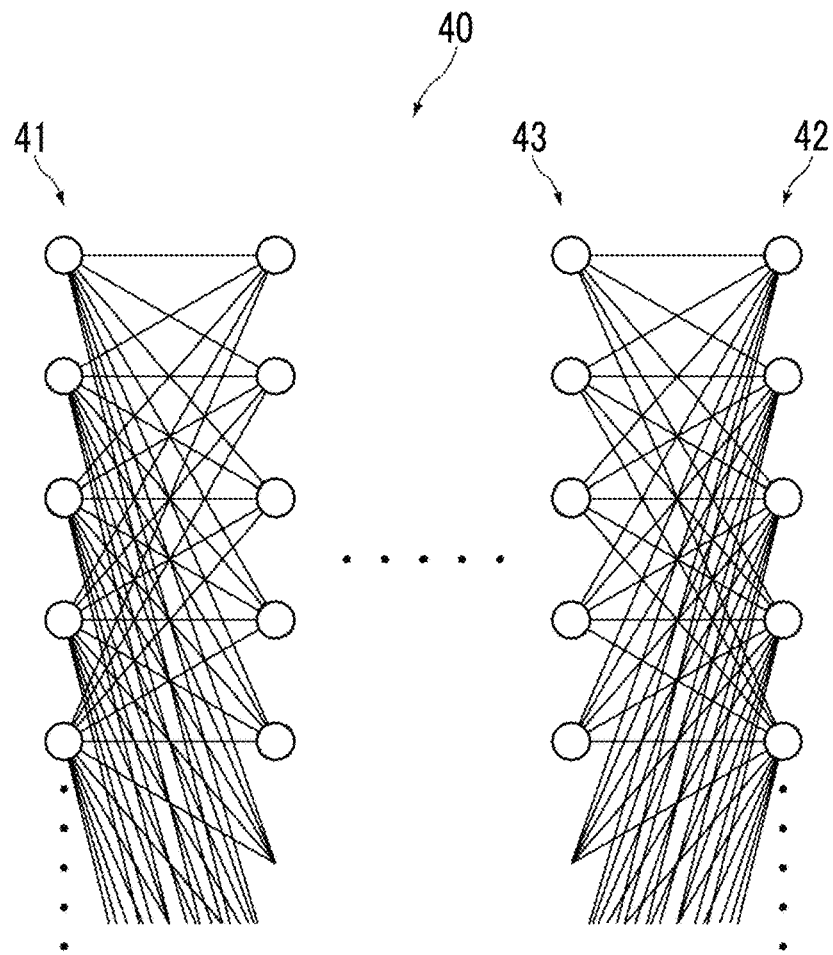
FIG. 3 is a diagram showing an example of a multilayered neural network.
FIG. 4 is a diagram showing a first classification result for a certain pixel of a lung region.

FIG. 3 is a diagram showing an example of a multilayered neural network. As shown in FIG. 3, the multilayered neural network 40 has a plurality of hierarchies including an input layer 41 and an output layer 42. In addition, reference number 43 is assigned to the hierarchy before the output layer 42. In the present embodiment, learning is performed such that a lung region included in the three-dimensional image V0 is classified into 33 types of case regions, that is, normal lung, ground glass opacity (GGO) tumor nodule shadow, mixed tumor nodule shadow, solid tumor nodule shadow, frosted glass shadow, pale frosted glass shadow, centrilobular frosted glass shadow, consolidation, low absorption, centrilobular emphysema, panlobular emphysema, normal pulmonary emphysema tendency, cyst, tree-in-bud appearance (TIB), small nodule (non-lobular centrality), centrilobular nodule shadow, interlobular septum thickening, bronchial wall thickening, bronchodilation, dilation of small bronchus, bronchogram, traction bronchodilation, cavitary infiltration shadow, cavitary tumor, reticular shadow, fine reticular shadow, honeycomb lung, pleural effusion, pleural thickening, chest wall, heart, diaphragm, and blood vessel. In the present embodiment, the case region includes a region showing a specific symptom or specific form within the lung region. Therefore, in the present embodiment, it is assumed that a region of a structure itself showing a specific form, such as the heart and the diaphragm, is also included in the case region.

In the present embodiment, the multilayered neural network 40 is made to learn 33 types of cases using a large number of teacher data (millions of pieces of teacher data). During learning, a voxel region normalized to a predetermined size (for example, 1.5 cm×1.5 cm×1.5 cm) is cut out from a three-dimensional image having a known case, and the image of the cut voxel region is used as teacher data. Then, the teacher data is input to the multilayered neural network 40, and the multilayered neural network 40 outputs a case region classification result. Then, the output result is compared with the teacher data, and the weight of coupling between hierarchies of units (indicated by circles in FIG. 3) included in respective layers of the multilayered neural network 40 is modified from the output side to the input side according to whether or not the output result is a correct solution or an incorrect solution. Then, the modification of the weight of coupling is repeated a predetermined number of times or until the error of a classification result to be output becomes 0% or becomes equal to or less than a predetermined threshold value using a large number of teacher data, and the learning is ended.

For classification, the first classification unit 21 extracts a lung region, which is a target region, from the three-dimensional image V0. As a method of extracting a lung region, it is possible to use any method, such as a method in which the signal value of each pixel in the three-dimensional image V0 is expressed using a histogram and threshold processing is performed to extract the lung or a region growing method based on a seed point showing the lung.

The first classification unit 21 sequentially cuts out the same region as the teacher data from the extracted lung region, and inputs the cut region to a discriminator that is the multilayered neural network 40 learned as described above. As a result, for a central pixel of the cut region, 33 evaluation values indicating the possibility of being each of 33 types of case regions are output. By performing the evaluation value output for all the pixels of the lung region, 33 types of evaluation values indicating the possibility of being each of 33 types of case regions are output for each pixel of the lung region. It is also possible to classify each pixel of the lung region into a case region having the largest value among the 33 types of evaluation values.

FIG. 4 is a diagram showing a first classification result for a certain pixel of the lung region. FIG. 4 shows evaluation values for top four types of cases having large evaluation values and bottom two types of cases having small evaluation values. As shown in FIG. 4, the evaluation value for the "reticular shadow" is the highest as 8.5, followed by 7.6 for the frosted glass shadow, 3.2 for the bronchodilation, and 2.9 for the infiltration shadow. The evaluation value of the normal lung is −7.1, and the evaluation value of a low absorption region (emphysema) is −12.3. Therefore, a pixel for which the evaluation values shown in FIG. 4 are output is classified into a reticular shadow as a case region.

The second classification unit 22 outputs a second classification result by converting the first classification result based on the conversion definition information selected from a plurality of pieces of conversion definition information. In the present embodiment, therefore, a plurality of pieces of conversion definition information for calculating the second classification result for each pixel of the lung region of the three-dimensional image V0 by converting the first classification result using the first classification unit 21 are stored in the storage 13.

In the present embodiment, two types of conversion definition information, that is, (1) first conversion definition information defining further classification of 33 types of case regions into fewer types of case regions than the 33 types of case regions as a conversion parameter and (2) second conversion definition information defining a weighting coefficient for each of the 33 types of case regions as a conversion parameter are prepared. Hereinafter, the first conversion definition information and the second conversion definition information will be described. First, the first conversion definition information will be described.

For example, in the case of pulmonary emphysema, emphysematosis progresses due to destruction of the alveoli or the like. The progression state of emphysematosis appears as low absorption in a CT image. Mild pulmonary emphysema is a slightly lower absorption lesion than the normal lung. In a case where the pulmonary emphysema progresses, a symptom called centrilobular emphysema, in which the center is destroyed in the lobule unit of lung and there is a region without pulmonary parenchyma, appears. In a case where the centrilobular emphysema further progresses, this grows into a state called panlobular emphysema in which a large region is completely destroyed. In pulmonary diagnosis, it is important to accurately evaluate a plurality of these types of symptoms and a normal lung region. Therefore, by classifying the lung region into a case region of each symptom and comparing the volume for each case region or evaluating a change in the size of a specific case region, the progression of disease is checked and the effect of treatment according to medication and the like is evaluated. On the other hand, in patients who do not suffer from other diseases at this point in time, lesions such as dot shadows and frosted glass shadows are shadows remaining as a result of past diseases in many cases. It is not necessary to evaluate case regions of such lesions in detail, and it is easier for diagnosis to treat these collectively as one group.

On the other hand, in the example of the progression of interstitial pneumonia, a fine reticular shadow occurs near the chest wall at the beginning, and the fine reticular structure gradually becomes large and grows into a larger reticular lesion (honeycomb lung). In the interstitial pneumonia, it is important for diagnosis to evaluate mainly such interstitial changes.

Depending on the way of thinking of a doctor, the purpose of the diagnosis, and the like, determination regarding in which state the intermediate state of the symptom should be included may change.

Therefore, the first conversion definition information defines further classification into fewer types of case regions than the 33 types of case regions by grouping the 33 types of case regions included in the first classification result.

FIG. 5 is a diagram showing the first conversion definition information. FIG. 5 shows conversion definition information for further classifying a plurality of types of cases into groups for pulmonary emphysema and conversion definition information for further classifying a plurality of types of cases into groups for interstitial pneumonia. As shown in FIG. 5, the conversion definition information for pulmonary emphysema is defined such that infiltration shadows and tumor shadows are collectively classified into one case of "high concentration including infiltration shadow", bronchodilation and bronchial wall thickening are collectively classified into one case of "bronchial tube", and frosted glass shadows, pale frosted glass shadows, reticular shadows, and linear shadows are collectively classified into one case of "frosted glass shadow and the like". Such a definition is a conversion parameter of the conversion definition information.

The conversion definition information for interstitial pneumonia is defined such that infiltration shadows and tumor shadows are collectively classified into one case of "high concentration including infiltration shadow", bronchodilation and bronchial wall thickening are collectively classified into one case of "bronchial tube", and mild low absorption region, centrilobular emphysema, and panlobular emphysema are collectively classified into one case region of "low absorption region".

In the above description, for example, the conversion definition information for pulmonary emphysema is defined such that the frosted glass shadow, the pale frosted glass shadow, the reticular shadow, and the linear shadow are collectively classified into one case of "frosted glass shadow and the like". However, the conversion definition information may be defined such that the frosted glass shadow, the pale frosted glass shadow, the reticular shadow, and the linear shadow are classified into one case region having the highest evaluation value among the frosted glass shadow, the pale frosted glass shadow, the reticular shadow, and the linear shadow. In this case, an average value of the maximum evaluation values is calculated for pixels classified into the frosted glass shadow, the pale frosted glass shadow, the reticular shadow, and the linear shadow. For example, for pixels classified into the frosted glass shadow, the evaluation value of the frosted glass shadow is the maximum. Therefore, an average value of evaluation values for the frosted glass shadow in all the pixels classified into the frosted glass shadow is calculated. In addition, for pixels classified into the pale frosted glass shadow, an average value of evaluation values for the pale frosted glass shadow in all the pixels classified into the pale frosted glass shadow is calculated. In addition, for pixels classified into the reticular shadow, an average value of evaluation values for the reticular shadow in all the pixels classified into the reticular shadow is calculated. For pixels classified into the linear shadow, an average value of evaluation values for the linear shadow in all the pixels classified into the linear shadow is calculated. Then, the pixels classified into the frosted glass shadow, the pale frosted glass shadow, the reticular shadow, and the linear shadow are classified into a case region having the largest calculated average value. For example, in a case where the average values of the evaluation values for the frosted glass shadow, the pale frosted glass shadow, the reticular shadow, and the linear shadow are 5.0, 6.2, 4.5, and 3.7, these four case regions are collectively classified into one case region of "pale frosted glass shadow" having the largest average value.

Next, the second conversion definition information will be described. The second conversion definition information defines a weighting coefficient for each of 33 types of case regions. FIG. 6 is a diagram showing the second conversion definition information together with an evaluation value in a certain pixel. FIG. 6 shows a weighting coefficient for each case region, an evaluation value calculated by the first classification unit 21, and a weighted evaluation value converted by using the weighting coefficient as will be described later. In FIG. 6, only the same case regions as in FIG. 4 are shown. As shown in FIG. 6, the weighting coefficients of a certain pixel are 0.8, 1.1, 0.8, 1.0, . . . , 1.2, and 0.9 in order from the top of FIG. 6. Here, the evaluation value output from the first classification unit 21 is the greatest in the case of the reticular shadow. However, in a case where the weighted evaluation value is calculated by weighting the evaluation value with the weighting coefficient, the evaluation value for the frosted glass shadow is the maximum. For this reason, in a case where the evaluation value shown in FIG. 6 is converted by using the conversion definition information shown in FIG. 6, a region that has been classified into the reticular shadow before conversion is classified into the frosted glass shadow after conversion. In the second conversion definition information, the weighting coefficient is a conversion parameter.

The first conversion definition information and the second conversion definition information can be defined for each disease, or can be defined for each doctor. FIG. 7 is a diagram showing conversion definition information defined for each doctor. In FIG. 7, the definition name of conversion definition information, a conversion method, and a conversion parameter are shown so as to be associated with a doctor ID specifying a doctor and a disease name. In FIG. 7, COPD is a chronic obstructive pulmonary disease.

In FIG. 7, <common to doctors> in the doctor ID column indicates conversion definition information common to all doctors. Definition name "A doctor exclusive use" indicates conversion definition information dedicated to A doctor having a doctor ID of 109801. Definition name "B doctor exclusive use" indicates conversion definition information dedicated to B doctor having a doctor ID of 100311. Definition name "C doctor exclusive use" indicates conversion definition information dedicated to C doctor having a doctor ID of 100307.

In FIG. 7, (1) in the conversion method column indicates the first conversion definition information, and (2) indicates the second conversion definition information. <Pulmonary emphysema group definition> and <interstitial pneumonia group definition> in the conversion parameter column are the definitions shown in FIG. 5. The values of W01, W02, . . . are weighting coefficients in the second conversion definition information. The numerical value of the subscript of the weighting coefficient indicates a number defined for each case region.

The conversion definition information described above is selected by the operator using the input unit 15 in a case where the medical image classification apparatus according to the present embodiment performs processing. Then, the selected conversion definition information is read from the storage 13 and is subjected to the second classification processing.

The second classification unit 22 outputs a second classification result by converting the first classification result based on the selected conversion definition information. Specifically, in a case where the first conversion definition information is selected, 33 types of case regions in the lung region are classified into fewer types of case regions than the 33 types of case regions, and a second classification result is output. In a case where the first conversion definition information is selected, the first classification unit 21 outputs the classification result of each pixel of the lung region, that is, the result of classification into a case region having the largest evaluation value in each pixel, as a first classification result.

On the other hand, in a case where the second conversion definition information is selected, the evaluation values of the 33 types of case regions are multiplied by weighting coefficients, each pixel of the lung region is classified based on the weighted evaluation values, and the second classification result is output. In a case where the second conversion definition information is selected, the first classification unit 21 outputs the 33 types of evaluation values in each pixel of the lung region as a first classification result.

In the present embodiment, both the first conversion definition information and the second conversion definition information can be selected. In this case, the second classification unit 22 multiplies the evaluation values of the 33 types of case regions by weighting coefficients using the second conversion definition information, and classifies each pixel of the lung region based on the weighted evaluation values. In addition, the second classification unit 22 classifies the 33 types of case regions, which have been classified based on the weighted evaluation values, into fewer types of case regions than the 33 types of case regions using the first conversion definition information, and outputs a second classification result.

Figure 8:
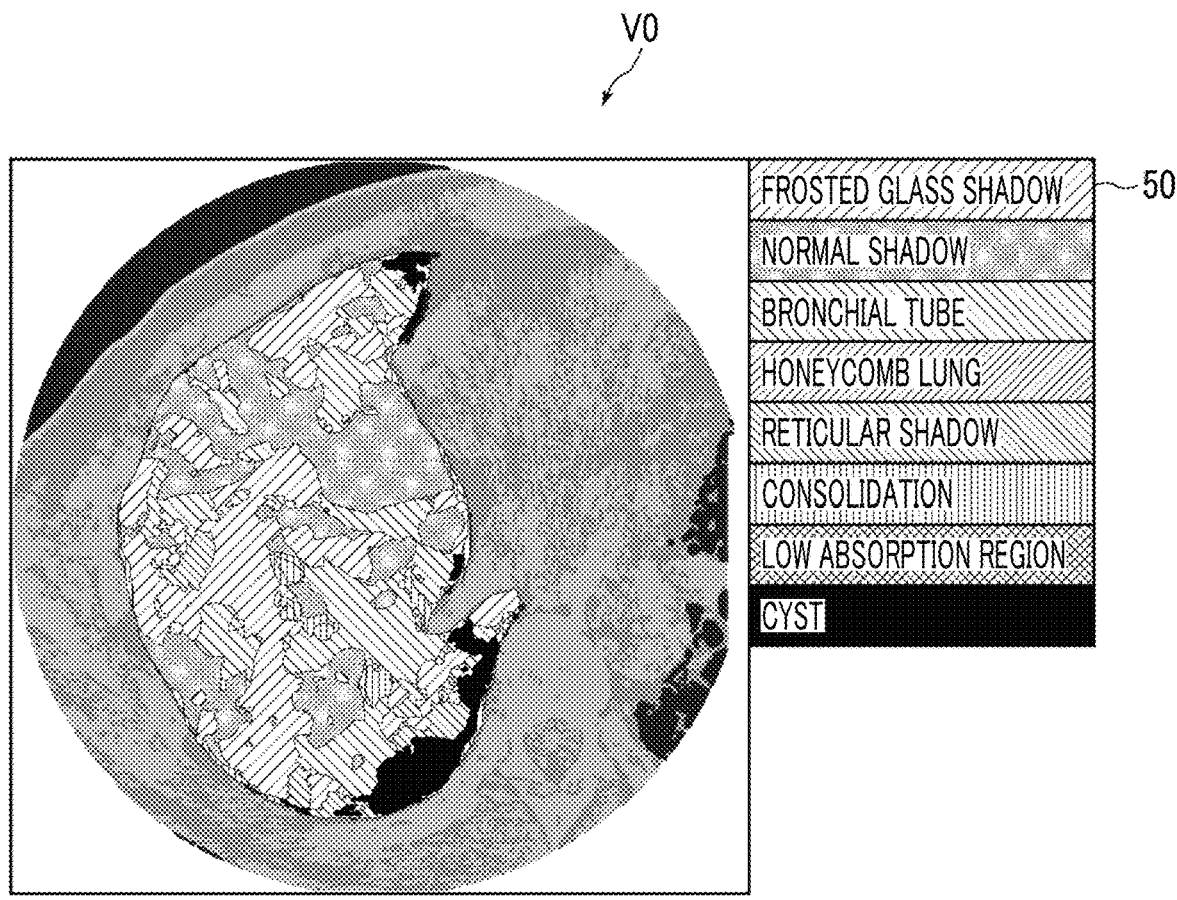
FIG. 8 is a diagram showing a second classification result displayed on a display.

The display control unit 23 displays the second classification result output from the second classification unit 22 on the display 14. Specifically, the display control unit 23 extracts, for respective pixels of the lung region included in the three-dimensional image V0, pixels classified into the same case region by the second classification result. The display control unit 23 assigns the same color to the pixels classified into the same case region. Then, the display control unit 23 displays the three-dimensional image V0, in which colors are assigned, on the display 14 as a second classification result. FIG. 8 is a diagram showing the second classification result displayed on the display 14. In FIG. 8, a tomographic image of a certain tomographic plane in the three-dimensional image V0 is shown, but V0 is shown as a reference numeral. In FIG. 8, for ease of explanation, the first conversion definition information is selected, and 33 types of case regions are classified into eight types of case regions of frosted glass shadow, normal shadow, bronchial tube, honeycomb lung, reticular shadow, consolidation, low absorption region, and cyst by the second classification unit 22.

As shown in FIG. 8, 33 types of case regions are grouped into eight types of case regions of frosted glass shadow, normal shadow, bronchial tube, honeycomb lung, reticular shadow, consolidation, low absorption region, and cyst, and different colors are assigned to these. In FIG. 8, the fact that the colors are different is shown by different patterns. In addition, FIG. 8 shows a reference 50 indicating which case each color is.

Figure 9:
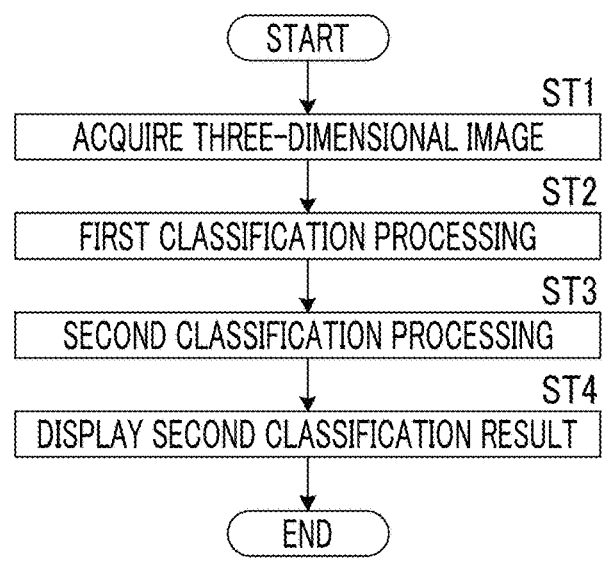
FIG. 9 is a flowchart showing the process performed in the first embodiment.

Next, the process performed in the first embodiment will be described. FIG. 9 is a flowchart showing the process performed in the first embodiment. It is assumed that the conversion definition information to be used is selected by the operator. First, the image acquisition unit 20 acquires the three-dimensional image V0 (step ST1), and the first classification unit 21 outputs a plurality of evaluation values indicating the possibility of being each of a plurality of types of case regions for each pixel of the three-dimensional image V0 (first classification processing: step ST2). Then, based on the selected conversion definition information, the second classification unit 22 converts the first classification result for each pixel of the three-dimensional image V0 based on the plurality of evaluation values, and outputs the second classification result for each pixel of the three-dimensional image V0 (second classification processing: step ST3). Then, the display control unit 23 displays the second classification result on the display 14 (step ST4), and ends the process.

As described above, according to the first embodiment, since the second classification result is output by converting the first classification result based on the selected conversion definition information, it is possible to appropriately classify the pixels of the three-dimensional image V0 into a plurality of types of case regions according to the selected conversion definition information.

In addition, since the conversion definition information is stored for each doctor, it is possible to appropriately classify the pixels of the three-dimensional image V0 into a plurality of types of case regions according to a doctor.

In the embodiment described above, the second classification unit 22 classifies the first classification result based on the conversion parameter defined in the conversion definition information. However, the conversion definition information may be made to be a second discriminator that is learned so as to receive 33 types of evaluation values output from the first classification unit 21 as an input and output 33 types of evaluation values again for each pixel of the lung region, and the second classification unit 22 may output the second classification result using the second discriminator selected from a plurality of second discriminators as conversion definition information. Hereinafter, this will be described as a second embodiment.

For the sake of explanation, the discriminator provided in the first classification unit 21 is hereinafter referred to as a first discriminator. The second discriminator is prepared for each case or each doctor as described above. In addition, since the configuration of a medical image classification apparatus according to the second embodiment is the same as the configuration of the medical image classification apparatus according to the first embodiment shown in FIG. 2, the detailed explanation of the apparatus will be omitted herein.

Similarly to the first classification unit 21, the second discriminator may be a multilayered neural network that is deep-learned. However, it is difficult to prepare a large number of evaluation values output from the first classification unit 21 as teacher data during the learning of the second discriminator. Therefore, in the second embodiment, the second discriminator is assumed to be a discriminator having a simple configuration capable of performing classification even with a relatively small number of pieces of teacher data.

In the second embodiment, the second discriminator is learned so as to output the same second classification result as in the case where the first classification result is converted using the conversion definition information described above with a plurality of evaluation values for a certain pixel output from the first classification unit 21 as an input. Specifically, learning is performed using logical regression analysis.

Assuming that the evaluation values output from the first discriminator are (X1, X2, X3, . . . , Xm; m=33) (hereinafter, referred to as first evaluation values), an evaluation value Yn (hereinafter, referred to as a second evaluation value) that is an output of one unit in the second discriminator is expressed by the following Expression (1). Here, α and β are constants determined by learning. n is the number of case regions classified by the second discriminator, and n evaluation values (second evaluation values) are output from the second discriminator. For this reason, in a case where the second discriminator reduces the number of classifications of the first classification result as in the case of the first conversion definition information, n is smaller than 33.

$$Yn=1/(1+exp(-(\alpha+\beta 1*X1+\beta 2*X2+\beta 3*X3+ \ldots +\beta m*Xm))) \quad (1)$$

In a case where learning using logical regression analysis is performed for all the cases, over-learning is likely to occur. Therefore, at the time of learning, it is preferable to adopt only the first evaluation value X of a case region relevant to a case region corresponding to the evaluation value Yn and set the value of the coefficient β to 0 for the first evaluation value for a less relevant case region.

In this manner, by providing the second discriminator as conversion definition information, it is possible to output the second classification result by converting the first classification result with a relatively higher degree of freedom than in a case where the conversion parameter is set for each piece of conversion definition information as in the first embodiment.

Here, the first classification unit 21 has a first discriminator learned by deep learning, and the 33 evaluation values (X1, X2, X3, . . . , Xm) corresponding to 33 types of case regions are output from the output layer 42 shown in FIG. 3. On the other hand, outputs (x1, x2, x3, . . . , xk; k is the number of units in the hierarchy 43) of each unit in the hierarchy 43 before the output layer 42 shown in FIG. 3 are important values for classification of case regions. Therefore, in the second embodiment, the second discriminator may be learned by using the output values (x1, x2, x3, . . . , xk) from the hierarchy 43 immediately before the output layer 42 in addition to the first evaluation value output from the output layer 42. In this case, the evaluation value Yn (hereinafter, referred to as a second evaluation value below) is expressed by the following Expression (2). Here, α, β, and γ are constants.

$$Yn=1/(1+exp(-(\alpha+\beta 1*X1+\beta 2*X2+\beta 3*X3+ \ldots +\beta m*Xm+\gamma 1*x1+\gamma 2*x2+\gamma 3*x3+ \ldots +\gamma k*xk))) \quad (2)$$

The second discriminator may also be learned using output values from not only the hierarchy immediately before the output layer 42 but also a hierarchy before the hierarchy immediately before the output layer 42.

In the first and second embodiments described above, the second classification result is displayed on the display 14. However, an instruction to modify the second classification result from the operator may be received, and the selected conversion definition information may be modified based on the modification instruction. Hereinafter, this will be described as a third embodiment.

Figure 10:
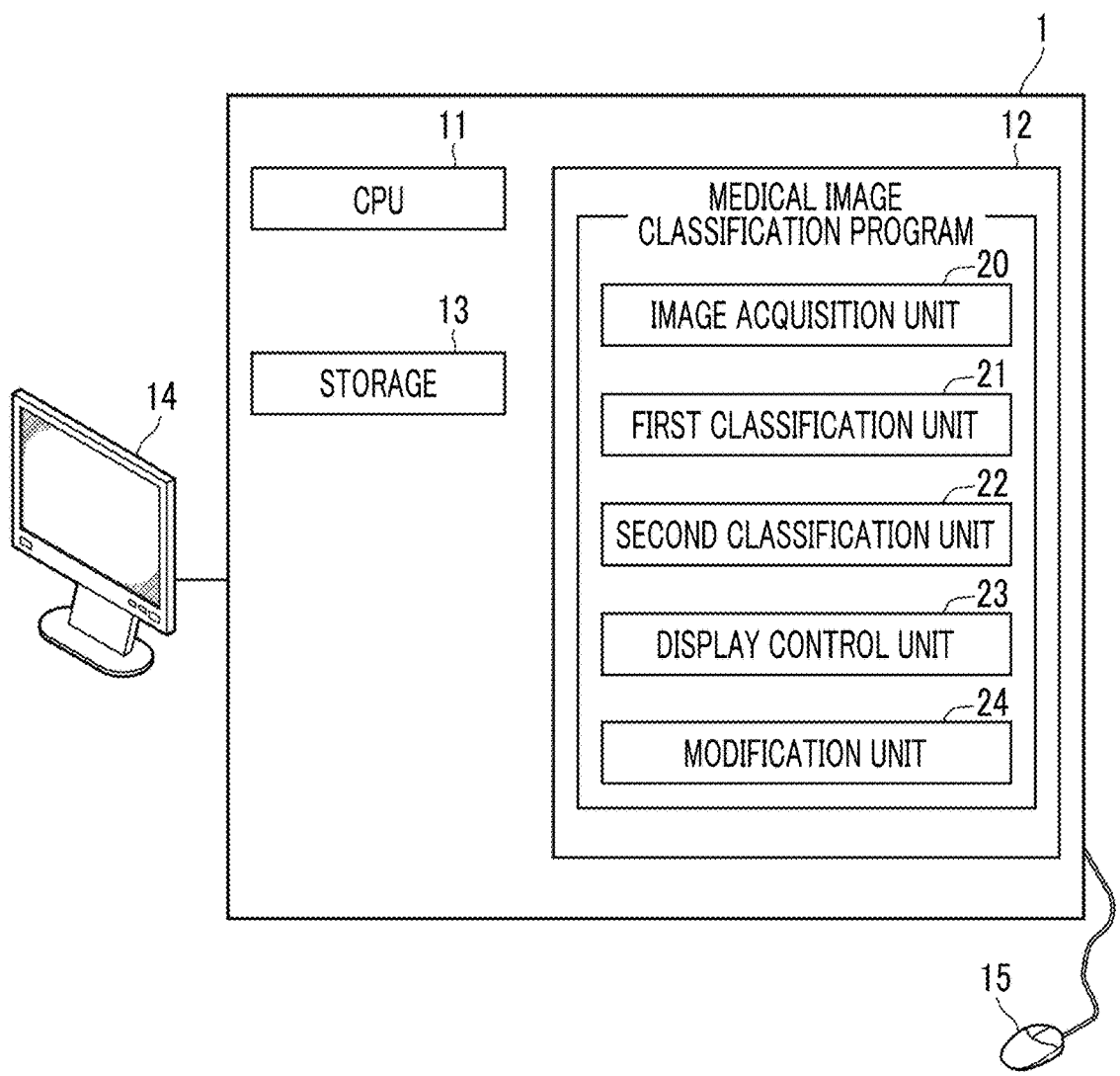
FIG. 10 is a schematic block diagram showing the configuration of a medical image classification apparatus according to a third embodiment.

FIG. 10 is a schematic block diagram showing the configuration of a medical image classification apparatus according to the third embodiment. In FIG. 10, the same components as in FIG. 2 are denoted by the same reference numbers, and the detailed explanation thereof will be omitted herein. As shown in FIG. 10, the medical image classification apparatus according to the third embodiment is different from the medical image classification apparatus according to the first embodiment in that a modification unit 24, which receives an instruction to modify the second classification result from the operator and modifies the selected conversion definition information based on the modification instruction, is provided.

Figure 11:
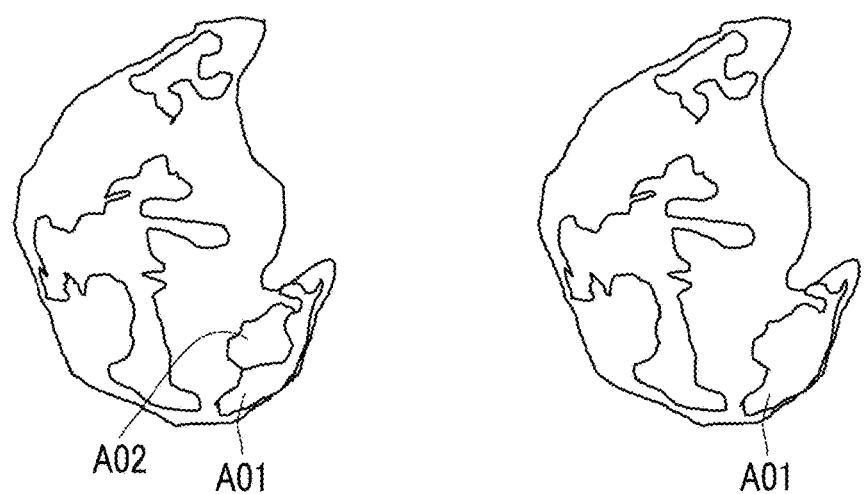
FIG. 11 is a diagram illustrating the modification of a second classification result.

FIG. 11 is a diagram illustrating the modification of a second classification result. Here, it is assumed that the second classification result is obtained by converting the first classification result based on the second conversion definition information. It is assumed that the boundary line of a case region A01 is changed so that the case region A01 and a case region A02 are included in the second classification result as shown on the left side of FIG. 11 and the case region A02 is included in the case region A01 as shown on the right side of FIG. 11 by operating the input unit 15 by the operator. The modification unit 24 receives a modification instruction from the operator, and modifies the conversion definition information so that a weighting coefficient (denoted as W01) for the case of the case region A01 is increased and a weighting coefficient (denoted as W02) for the case of the case region A02 is decreased. Specifically, the modification unit 24 modifies the weighting coefficients W01 and W02 so that the second evaluation value of the case region A01, among the first evaluation values in each pixel in the lung region that are output from the first classification unit 21, is larger than the second evaluation value of the case region A02.

By modifying the conversion definition information as described above, in the case of performing the second classification processing next using the same conversion definition information, the second evaluation value is output so that the case region A01 is maximized by the second classification processing for a pixel for which the first evaluation value of the case region A02 is maximized. Therefore, a second classification result reflecting the modification by the operator is obtained.

In a case where the weighting coefficient is modified as described above, there is a possibility that the classification result will change not only at the boundary between the case region A01 and the case region A02 shown in FIG. 11 but also in other case regions. For this reason, it is preferable that the conversion definition information modified in the third embodiment is applied only to pixels for which evaluation values for the case regions A01 and A02 are maximized in the subsequent processing.

In the above description, the conversion definition information is modified by changing the boundary of the case region A01 in the second classification result displayed on the display 14. However, the conversion definition information may be modified by performing modification so as to change the weighting coefficients W01 and W02 for the case regions A01 and A02 and displaying the second classification result based on the modified conversion definition information each time the weighting coefficients W01 and W02 are changed.

In the first to third embodiments described above, the first discriminator provided in the first classification unit 21 may be upgraded to improve the accuracy or the like. In such a case, it is preferable to also modify the conversion definition information at the same time. Hereinafter, this will be described as a fourth embodiment.

Figure 12:
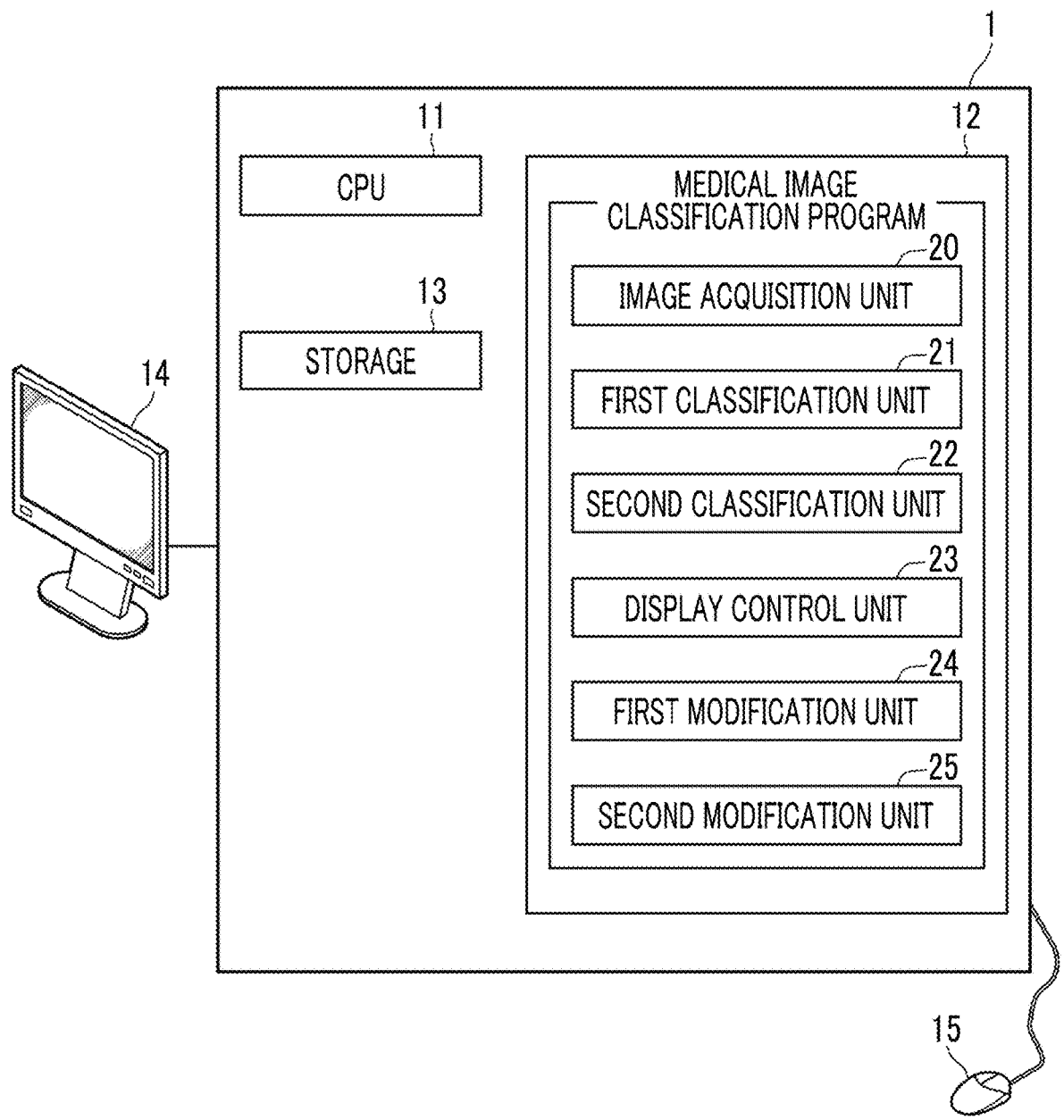
FIG. 12 is a schematic block diagram showing the configuration of a medical image classification apparatus according to a fourth embodiment.

FIG. 12 is a schematic block diagram showing the configuration of a medical image classification apparatus according to the fourth embodiment. In FIG. 12, the same components as in FIG. 10 are denoted by the same reference numbers, and the detailed explanation thereof will be omitted herein. As shown in FIG. 12, the medical image classification apparatus according to the fourth embodiment is different from the medical image classification apparatus according to the third embodiment in that the modification unit 24 of the medical image classification apparatus according to the third embodiment is the first modification unit 24 and a second modification unit 25, which modifies the conversion definition information according to the change of the first classification unit 21, is provided.

In the fourth embodiment, the modification to conversion definition information performed by the first modification unit 24 in the third embodiment is stored in the storage 13 as first modification information. In a case where the first discriminator of the first classification unit 21 is upgraded, the second modification unit 25 modifies the conversion definition information with reference to the first modification information stored in the storage 13. In the third embodiment, the weighting coefficients W01 and W02 for the case regions A01 and A02 are modified. Therefore, the second modification unit 25 modifies the weighting coefficients W01 and W02 according to the situation of upgrade of the first discriminator. Specifically, the conversion definition information is modified so that the same second classification result as in a case where the conversion definition information modified according to the third embodiment is used is obtained regardless of the change of the first evaluation value for the case regions A01 and A02 due to upgrade of the first discriminator.

The second classification result of the first classification unit 21 before upgrade and the second classification result after upgrade and after the conversion definition information has been modified may be simultaneously displayed on the display 14. As a result, the operator can appropriately modify the conversion definition information in a case where further modification is required. At this time, a warning may be given in a case where a large difference occurs in the second classification result before and after upgrade. As a result, the operator can modify the conversion definition information again.

As described above, in the fourth embodiment, since the conversion definition information is modified by the second modification unit 25, the same second classification result as before can be obtained even in a case where the first discriminator is upgraded.

In the fourth embodiment described above, the second modification unit 25 is provided in the medical image classification apparatus according to the third embodiment. However, the second modification unit 25 may also be provided in the medical image classification apparatuses according to the first and second embodiments described above. In particular, in a case where the conversion definition information is the second discriminator, a second classification result similar to the previous one can be obtained by setting the values of the coefficients α, β, and γ again by automatically performing re-learning using the stored previous learning data according to the change of the first classification unit 21.

In each of the embodiments described above, the first conversion definition information and the second conversion definition information are used. However, there is a case where an intermediate state needs to be defined for 33 types of case regions. For example, there is a case where an intermediate state between the reticular shadow and the frosted glass shadow needs to be defined. In this case, it is preferable to prepare conversion definition information defined to add the classification of "between reticular shadow and frosted glass shadow". Specifically, as the conversion definition information, calculation of "between reticular shadow and frosted glass shadow=2×(evaluation value of reticular shadow)×(evaluation value of frosted glass shadow)/((evaluation value of reticular shadow)+(evaluation value of frosted glass shadow))" is defined. This calculation is to calculate the harmonic mean. As a result, as shown in FIG. 13, the state of "between reticular shadow and frosted glass shadow" can be added to the second classification result. In FIG. 13, since "between reticular shadow and frosted glass shadow" is the maximum value in the second classification result, this pixel is classified into "between reticular shadow and frosted glass shadow".

In each of the embodiments described above, conversion definition information is prepared for each doctor. However, conversion definition information may be prepared for each patient, each hospital, or each use.

Hereinafter, the effect of the present embodiment will be described.

By storing at least one of conversion definition information for each patient, conversion definition information for each hospital, conversion definition information for each use, or conversion definition information for each doctor, it is possible to appropriately classify pixels of a medical image into a plurality of types of case regions according to at least one of each patient, each hospital, each use, or each doctor.

Since an instruction to modify the second classification result displayed on display unit is received and the conversion definition information selected based on the modification instruction is modified, it is possible to appropriately classify the pixels of the medical image into a plurality of types of case regions by reflecting the intention of the person who gives the modification instruction using the modified conversion definition information.

In a case where an algorithm for calculating a plurality of evaluation values is changed, a plurality of pieces of conversion definition information are modified so that the second classification result matches that in a case where a plurality of evaluation values calculated by the algorithm before change are used. Therefore, even though the algorithm for calculating the evaluation values is changed, it is possible to appropriately classify the pixels of the medical image into a plurality of types of case regions by reflecting the second classification result until then.

Explanation of References

What is claimed is:

1. A medical image classification apparatus for classifying pixels of a medical image into a plurality of types of case regions, the apparatus comprising:
processing circuitry configured to output a plurality of evaluation values indicating a possibility of being each of the plurality of types of case regions for each pixel of the medical image; and storage unit for storing a plurality of pieces of conversion definition information for calculating a second classification result for each pixel of the medical image by converting a first classification result for each pixel of the medical image based on the plurality of evaluation values;

the processing circuitry further configured to output the second classification result by converting the first classification result based on conversion definition information selected from the plurality of pieces of conversion definition information, wherein the processing circuitry outputs the second classification result obtained by classifying each pixel of the medical image into any of the plurality of types of case regions, wherein the conversion definition information defines a weighting coefficient for each of the plurality of types of case regions, and wherein the processing circuitry calculates a plurality of weighted evaluation values by performing a weighting operation on the plurality of evaluation values based on the weighting coefficient, classifies each pixel of the medical image into any of the plurality of types of case regions based on the weighted evaluation values, and outputs the second classification result.

2. The medical image classification apparatus according to claim 1, wherein the conversion definition information defines further classification of the plurality of types of case regions into fewer types of case regions than the plurality of types of case regions, and the processing circuitry classifies each pixel of the medical image into any of the fewer types of case regions and outputs the second classification result.

3. The medical image classification apparatus according to claim 1, wherein the storage unit stores at least one of the conversion definition information for each patient, the conversion definition information for each hospital, the conversion definition information for each purpose, or the conversion definition information for each doctor.

4. The medical image classification apparatus according to claim 1, wherein the processing circuitry has a first discriminator learned so as to output a plurality of evaluation values indicating a possibility of being each of the plurality of types of case regions for each pixel of the medical image.

5. The medical image classification apparatus according to claim 4, wherein the first discriminator has a plurality of hierarchies learned by a deep learning method, and the plurality of evaluation values are output from a final hierarchy of the plurality of hierarchies, and the processing circuitry outputs the second classification result by further using an output of a hierarchy before the final hierarchy in the first discriminator.

6. The medical image classification apparatus according to claim 1, wherein the conversion definition information is a second discriminator that is learned so as to output the second classification result with the plurality of evaluation value as an input.

7. The medical image classification apparatus according to claim 1, further comprising:

display control unit for displaying the second classification result on display unit.

8. The medical image classification apparatus according to claim 1, further comprising:

input unit for receiving an instruction to modify the second classification result;

wherein the processing circuitry is further configured to modify the selected conversion definition information based on the modification instruction.

9. The medical image classification apparatus according to claim 1, wherein the processing circuitry is further configured to modify the plurality of pieces of conversion definition information such that the second classification result matches that in a case where the plurality of evaluation values output from the processing circuitry before change are used in a case where the processing circuitry is changed.

10. A medical image classification method of classifying pixels of a medical image into a plurality of types of case regions, the method comprising:

outputting a plurality of evaluation values indicating a possibility of being each of the plurality of types of case regions for each pixel of the medical image; and outputting a second classification result by converting a first classification result based on conversion definition information selected from a plurality of pieces of conversion definition information for calculating the second classification result for each pixel of the medical image by converting the first classification result for each pixel of the medical image based on the plurality of evaluation values,.

wherein the second classification result obtained by classifying each pixel of the medical image into any of the plurality of types of case regions is output, wherein the conversion definition information defines a weighting coefficient for each of the plurality of types of case regions, and wherein a plurality of weighted evaluation values is calculated by performing a weighting operation on the plurality of evaluation values based on the weighting coefficient, each pixel of the medical image is classified into any of the plurality of types of case regions based on the weighted evaluation values, and the second classification result is output.

11. A non-transitory computer-readable storage medium that stores a medical image classification program for causing a computer to execute a medical image classification method of classifying pixels of a medical image into a plurality of types of case regions, the program causing the computer to execute:

a step of outputting a plurality of evaluation values indicating a possibility of being each of the plurality of types of case regions for each pixel of the medical image; and a step of outputting a second classification result by converting a first classification result based on conversion definition information selected from a plurality of pieces of conversion definition information for calculating the second classification result for each pixel of the medical image by converting the first classification result for each pixel of the medical image based on the plurality of evaluation values, wherein the second classification result obtained by classifying each pixel of the medical image into any of the plurality of types of case regions is output, wherein the conversion definition information defines a weighting coefficient for each of the plurality of types of case regions, and wherein the a plurality of weighted evaluation values is calculated by performing a weighting operation on the plurality of evaluation values based on the weighting coefficient, each pixel of the medical image is classified into any of the plurality of types of case regions based on the weighted evaluation values, and the second classification result is output.

* * * * *